United States Patent
Malmasson

[19]

[11] Patent Number: 5,805,651
[45] Date of Patent: Sep. 8, 1998

[54] DEVICE FOR MEASURING AT LEAST ONE PHYSICAL PARAMETER INSIDE THE CORE OF A NUCLEAR REACTOR

[75] Inventor: Jacques Malmasson, Evry, France

[73] Assignee: Framatome, Courbevoie, France

[21] Appl. No.: 674,263

[22] Filed: Jul. 1, 1996

[30] Foreign Application Priority Data

Jun. 30, 1995 [FR] France .................................. 95 07938

[51] Int. Cl.⁶ .................................................. G21C 17/10
[52] U.S. Cl. ............................................ 376/245; 376/203
[58] Field of Search ...................................... 376/245, 254, 376/203, 240, 249

[56] References Cited

U.S. PATENT DOCUMENTS 5,426,676  6/1995  Hopkins ................................. 376/203

FOREIGN PATENT DOCUMENTS

| 2 265 840 A2 | 5/1988 | European Pat. Off. . |
| 0 393 367 A1 | 10/1990 | European Pat. Off. . |
| 0 577 453 A1 | 1/1994 | European Pat. Off. . |
| 28 17 830 A1 | 10/1979 | Germany . |
| 43 03 746 A1 | 3/1994 | Germany . |

*Primary Examiner*—Charles T. Jordan
*Assistant Examiner*—Matthew J. Lattig
*Attorney, Agent, or Firm*—Pollock, Vande Sande & Priddy

[57] ABSTRACT

The measurement device includes a means (18) for leaktight passage of a measurement conduit (20), produced in the form of a thimble, and an element (25) for connecting the end of the measurement conduit (20) to a smooth cylindrical extension element. The connection element (25) is produced in the form of a sleeve (26), the internal bore of which includes a first part (35) for receiving the measurement conduit (20) and a second part (36) for receiving the smooth cylindrical extension element. The connection element (25) includes, at the ends of the sleeve (26), a first removable means (28) for fastening and leaktight passage of the measurement conduit (20), and a second removable means (30) for fastening and leaktight passage of the smooth cylindrical extension element. The invention applies both to mobile-probe devices for measuring in the core of the reactor and to fixed-probe measurement devices.

13 Claims, 5 Drawing Sheets

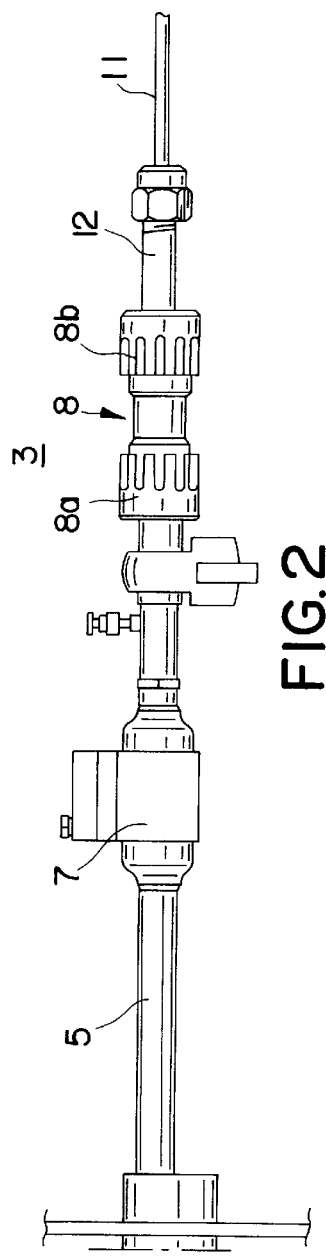
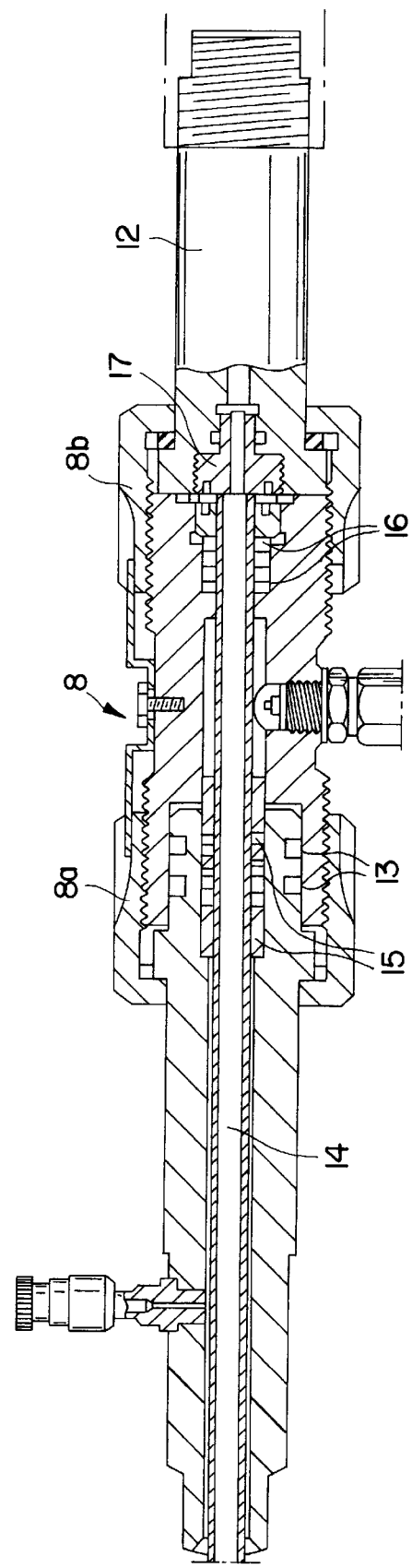
FIG.2
FIG.3

DEVICE FOR MEASURING AT LEAST ONE PHYSICAL PARAMETER INSIDE THE CORE OF A NUCLEAR REACTOR

The invention relates to a device for measuring at least one physical parameter, such as temperature or neutron flux, inside the core of a nuclear reactor, and more particularly of a nuclear reactor cooled by pressurized water.

Pressurized water nuclear reactors include a core formed by prismatic assemblies arranged vertically and resting on a support plate, inside the vessel of the nuclear reactor.

During operation of the nuclear reactor, it is necessary to carry out periodic measurements of neutron flux or temperature actually inside the core. For this purpose, use is made of fission detectors with very small dimensions or thermocouples which can be moved by remote control using drive cables inside tubes which are closed at one of their ends, called thimbles. The thimbles are introduced with a predetermined distribution in some of the core assemblies, after having passed through an instrumentation guide conduit. Each of the instrumentation guide conduits includes a guide tube connecting a measurement room to the vessel bottom head of the nuclear reactor, via a vessel bottom head penetration sleeve and a vertical channel passing through the lower internals of the reactor, in alignment with the vertical guide tube of the fuel assembly into which the thimble is introduced.

By moving the flux detectors inside the thimbles placed in fuel assemblies of the core, it is possible to take flux measurements of the entire height of the core.

It is also possible to introduce into a thimble a set of sensors consisting of neutral flux detectors or temperature-measurement sensors which are fixed in spaced arrangements along the length of a measurement cable which is introduced into the thimble or into closed tubing similar to a thimble. The flux or temperature detectors, integral with the measurement cable, are thus placed inside the core in fixed arrangements staggered along the height of the core.

It is therefore possible to take measurements inside the core at various points along the height of the core, by using either fixed probes or mobile probes.

The guide conduits which are connected to the vessel bottom head communicate with the internal volume of the vessel which contains the cooling water under pressure and at very high temperature and allow the passage of a measurement conduit, a part of which penetrates into the core of the nuclear reactor. The measurement conduits must be capable of being moved inside the guide conduits, for example in order to extract them from the core assemblies or extract them completely from the guide conduits, in the event that replacement is necessary. A relatively large radial clearance is left between the thimble-type measurement conduit and the guide conduit, allowing movements of the measurement conduits inside the guide conduits. Pressurized reactor cooling water fills the annular space arranged between the internal surface of the guide conduit and the external surface of the thimble, which is therefore subjected to a fluid at very high temperature and at very high pressure. Furthermore, the open end of the thimble, opposite the end which is engaged inside the core of the nuclear reactor, must be accessible from the measurement room of the nuclear reactor. In the case of using mobile probes, the probes are engaged inside the thimble and moved from the measurement room. The measurement probes are fixed to a flexible element which is pulled or pushed in order to move them. The measurement signals are recovered and processed inside the measurement room. Use is made of a displacement and measurement assembly making it possible to move the mobile probes in controlled fashion and to recover and process the measurement signals. In the case of using fixed probes, these probes are connected to a measurement cable which must be connected inside the measurement room to a signal processing assembly.

In all these cases, it is necessary to have access to the open end of the thimble housed in the guide conduit. The guide conduit includes a device for the leaktight passage of the thimble, on an end part arranged in the measurement room. This leaktight thimble passage device, generally called a nozzle, includes sets of seals making it possible to ensure leaktightness around the surface of the end of the thimble where it exits the guide conduit. The nozzle includes an upstream end through which the end of the thimble penetrates, and a downstream end to which a thimble extension making it possible to form the connection between the nozzle and the assembly for displacement and for recovering the measurement signals from the probes is generally connected.

The end of the measurement conduit or thimble is fixed by welding on a part of the extension by means of which connection is made between the thimble and the nozzle. The nozzle includes a nut intended to bear on a shoulder of the extension in order to fix it on the nozzle.

When it is desired to move the thimbles inside the guide conduits, for example in order to extract the thimbles from the fuel assemblies before refuelling, the nut is removed from the nozzle and the extension of the thimble is pulled. The thimble can be replaced inside the guide conduit by pushing the extension.

When it is desired to repair a part of the guide conduit, for example to repair or replace the nozzle fixed on the guide conduit, it may be necessary to extract the thimble fully from the guide conduit. Extraction of the thimble inside the measurement room of the nuclear reactor is an intricate operation because the thimble is very long and its activation may be high after it has remained in the operating nuclear reactor for some time. It is generally necessary to remove the thimble by cutting inside the measurement room and storing the sections of the thimble in a container. Prior to this operation of removing the thimble, it is necessary to separate the thimble from its extension by machining the connecting weld between the thimble and the extension.

It has also been proposed, in order to perform a repair on an element of the guide conduit, such as the nozzle, to separate the thimble from its extension and move the thimble upstream inside the guide conduit, that is to say towards the vessel of the nuclear reactor, so that, at the end of the movement, the end of the thimble previously separated from the extension is upstream of the device to be replaced or to be repaired. It is also necessary to plug the open end of the thimble, and the annular space between the thimble and the guide conduit, in leaktight fashion in a zone located upstream of the device to be repaired or to be replaced.

In order to perform these various thimble movement and plugging operations, use is made of equipment which can be manipulated from the measurement room of the nuclear reactor.

The method and the equipment used have formed the subject matter of a patent application in the name of the companies FRAMATOME and ATEA, SociétéAtlantique de Techniques Avancées filed on the same day as the present application.

In order to implement the method, it nevertheless remains necessary to separate the thimble from its extension, or from a part for connection to the extension, by a machining operation which presents drawbacks because machining cuttings are produced in the measurement room of the nuclear reactor. In addition, this operation may be relatively time-consuming and intricate; when returning the thimble to service, it is necessary to reweld an extension to the end of the thimble.

A method, described in FR-A-2,693,310 in the name of the company FRAMATOME, is also known which allows slight modification of the service position of a thimble inside a guide conduit, in order to move the preferential wear zones of the thimble inside the nuclear reactor, along the length of the thimble. The life of the thimble is thus extended.

In FR-A-2,693,310, a device is provided for modifying the axial position of the thimble inside the guide conduit, which includes a thimble extension of a particular form, having a tapped bore making it possible to receive a threaded part fixed to the end of the thimble, which is screwed into the extension. By using extensions having a tapped opening of suitable length and, optionally, one or more spacers arranged around the thimble, it is possible to vary the position of the thimble inside the guide conduit. Such a device requires the presence of a threaded element attached and welded to the end of the thimble.

In the case of using sensors in a fixed position inside the core of the nuclear reactor, these sensors being fixed on a cylindrical element, such as a cable, engaged in tubing similar to a thimble, the thimble passage nozzles according to the prior art do not allow simple connection of the measurement cable to a measurement assembly inside the room of the nuclear reactor as well as perfect tightness around the cylindrical element, making it possible to prevent any nuclear reactor cooling water from entering the measurement room, in the event of cracks in the thimble.

The object of the invention is to provide a device for measuring at least one physical parameter inside the core of a nuclear reactor, including a measurement conduit of elongate shape, a conduit for guiding the measurement conduit between a measurement room and the nuclear reactor core arranged inside a vessel, a means for leaktight passage of the measurement conduit at one end of the guide conduit located in the measurement room, an assembly for processing the measurements and a cylindrical element, extending the measurement conduit, arranged between the means for leaktight passage of the measurement conduit and the assembly for processing the measurements, characterized in that it furthermore includes an element for connecting an end part of the measurement conduit to the extension element, including a body consisting of a tubular sleeve comprising, along its axis, a first bore for receiving the end part of the measurement conduit, having a cylindrical smooth surface, extending between a first axial end of the sleeve and a shoulder inside the sleeve, a second bore for receiving the cylindrical element, extending to the second axial end of the sleeve, a first removable means for fastening and leaktight passage of the measurement conduit at the first end of the sleeve, for ensuring leaktight passage of the measurement conduit into the first bore of the sleeve, and a second removable means for fastening and leaktight passage at the second end of the sleeve, for ensuring leaktight passage of the cylindrical element into the second bore of the sleeve.

In order to explain the invention clearly, a description will now be given, by way of nonlimiting example, with reference to the appended figures, of a measurement device according to the invention and according to a plurality of alternative embodiments.

FIG. 2 is a view in side elevation of some of the elements of a guide conduit of the measurement device, placed inside the measurement room.

FIG. 3 is a sectional view on a larger scale of a part of the guide conduit represented in FIG. 2, ensuring leaktight passage of a measurement conduit and connection of an extension, according to the prior art.

FIG. 1 shows the pressurized water nuclear reactor vessel 1 arranged inside a reactor pit 2 constituting a part of the concrete structure of the nuclear reactor.

Figure 1:
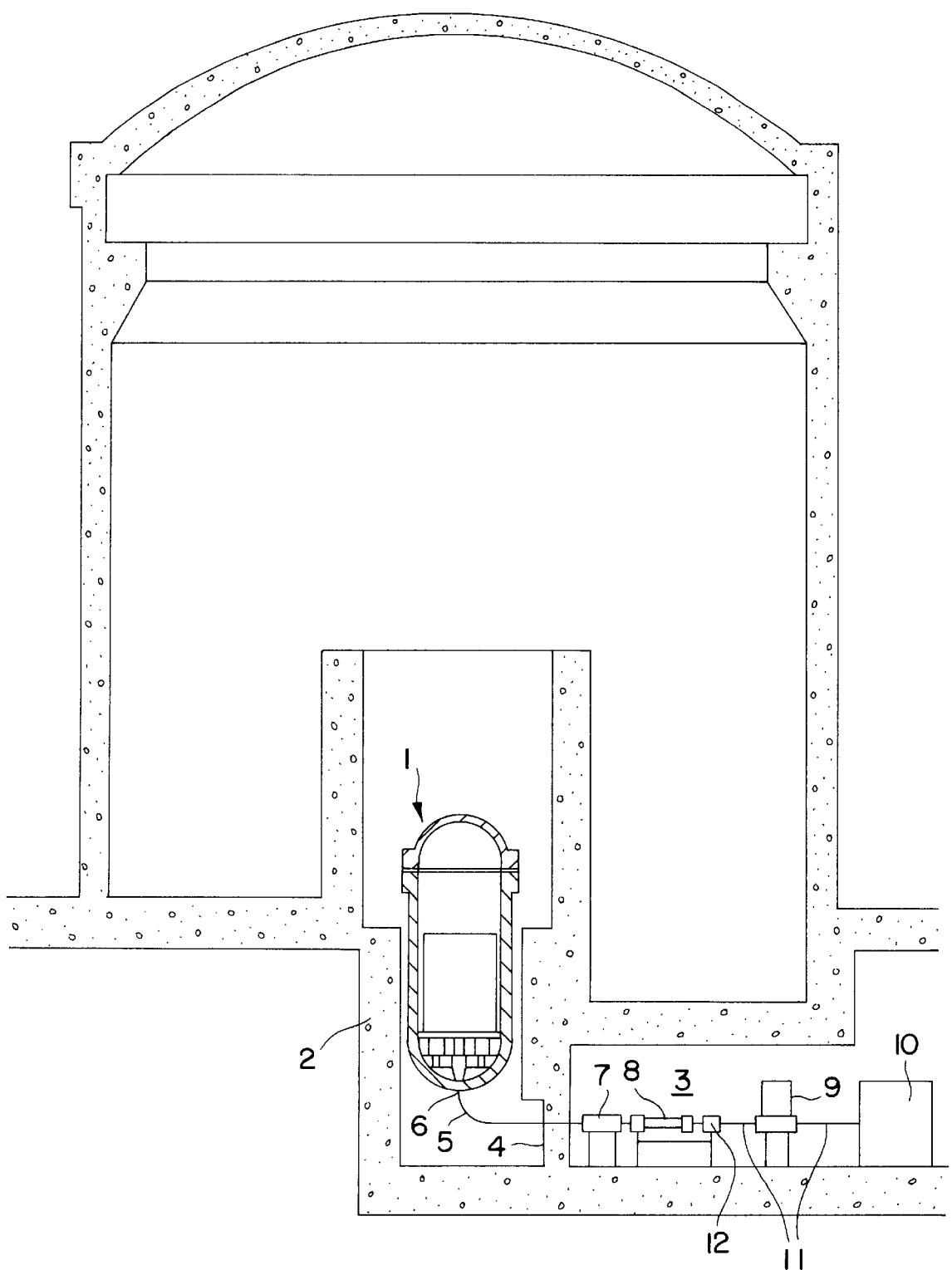
FIG. 1 is a schematic view in elevation and in partial section of the vessel of a pressurized water nuclear reactor and of a device for measuring physical parameters inside the core of the nuclear reactor.

A measurement room 3 surrounded by concrete walls is arranged laterally relative to the reactor pit 2. One of the side walls 4 of the room 3 separates this room from the reactor pit 2. Instrumentation guide conduits such as 5 are connected at one of their ends to a vertical penetration sleeve 6 of the vessel bottom head 1 and connect the vessel bottom head 1 to the instrumentation room 3 which each of the measurement conduits 5 penetrates horizontally. On the horizontal extension of each of the guide conduits 5 inside the room 3 are arranged, successively, starting from the penetration wall 4 of the room 3, a manual valve 7, a nozzle 8 for leaktight passage of a thimble introduced into the guide conduit 5, and an automatic valve 9.

The nozzle 8 ensures leaktight passage of a thimble which is connected at the exit of the nozzle 8 to a thimble extension 12 which ensures passage of a cylindrical element 11 between the nozzle 8 and a measurement and displacement assembly 10.

In the case of using mobile probes, the cylindrical element 11 has a tubular shape, which makes it possible to ensure passage of the mobile probes fixed to the end of a drive cable inside the thimble extending along the length of the guide conduit 5. In this case, the measurement assembly 10 includes means for moving the probes inside the guide tubes and means for collecting the measurement signals from each of the probes.

In the case of using fixed probes, the cylindrical element 11 is a measurement cable on which are fixed the probes which are introduced in a fixed position into the thimble placed in the core of the nuclear reactor.

FIG. 2 represents in more detail the elements arranged on the guide conduit 5 inside the measurement room 3.

The nozzle 8, which is represented in FIGS. 2 and 3 and allows leaktight passage of a thimble 14, includes a nozzle body which is threaded at its ends on which nuts 8a and 8b are engaged. The nut 8a makes it possible to connect a part for joining the guide conduit 5 to the body of the nozzle 8, at the exit of the manual valve 7. A set of seals 13 is interposed between the part for joining the conduit 5 to the body of the nozzle 8. In addition, a packing seal 15 is arranged around the thimble 14 in order to allow its leaktight passage into the body of the nozzle 8.

The second nut 8b of the nozzle 8 makes it possible to fix the thimble extension 12 to the exit of the body of the nozzle 8.

The nozzle represented in FIG. 3, and the thimble 14 for which the nozzle 8 ensures leaktight passage inside the measurement room 3, are produced in accordance with the arrangement described in FR-A-2,693,310. The open end of the thimble 14 is connected by welding to an externally threaded connection part 17. The extension 12 includes a tapped bore allowing the extension to be screwed onto the threaded connection part 17 fixed to the end of the thimble 14.

It is possible to modify the initial position of the thimble 14 inside the guide conduit, so as to modify the position of the wear zones of the thimble in the operating reactor, by using extensions whose tapped bore has a variable depth.

A packing seal 16 is arranged around the thimble so as to ensure leaktightness between the exit part of the thimble and the body of the nozzle 8.

The device which has just been described, which makes it possible to implement a method for using a measurement device inside the core of a nuclear reactor, with limitation of the wear on the thimbles, requires the use of extensions adapted to each of the positions chosen for the thimble inside the guide conduit. It is furthermore necessary to use spacers for axially blocking the end of the thimble, in the case of extensions whose bore is longer than the connection part 17. Mounting of the extension is therefore relatively complex.

In addition, the thimble 14 must include at its end a threaded connection part, the diameter of which is substantially greater than the external diameter of the smooth part of the thimble introduced into the guide conduit.

In the event that it is necessary to perform an operation such as changing the gaskets of the packing seals of the nozzle 8 or else repairing or replacing the nozzle or another device placed on the guide conduit, for example the manual valve 7, it is necessary either to extract the thimble from the guide conduit, which presents many drawbacks, as was explained above, or resort to a method in which the thimble is moved upstream inside the guide conduit and the thimble, and the annular space between the thimble and the guide conduit, are plugged. In order to implement such a method, it is necessary to machine the end of the thimble 14 in order to separate it from the part 17 joining it to the extension 12. Such an operation, carried out inside the measurement room of the nuclear reactor, presents drawbacks.

Furthermore, when using a measurement device including fixed probes which are introduced into tubing similar to the thimble 14, the known device of the prior art, represented in FIG. 3, does not make it possible to ensure leaktightness around the measurement cable, so that if the thimble-type tubing is cracked, the pressurized reactor cooling water which penetrates the tubing can flow into the measurement room of the nuclear reactor.

Figure 4:
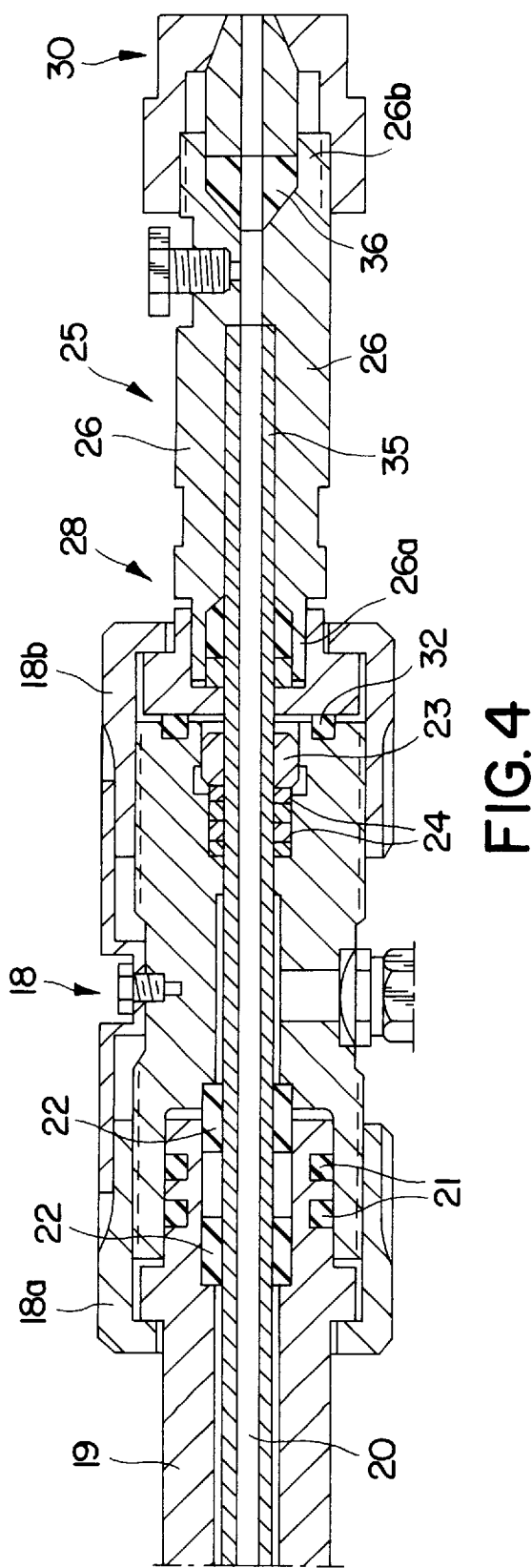
FIG. 4 is a sectional view, similar to the view in FIG. 3, of a part of a guide conduit of a measurement device according to the invention.

FIG. 4 represents part of a measurement device according to the invention, including a nozzle 18 for leaktight passage of a thimble 20 at the exit of a guide conduit 19 into the measurement room of the nuclear reactor.

The nozzle 18 is practically similar to the nozzle 8 of the device according to the prior art, represented in FIG. 3. The nozzle 18 includes a nozzle body, threaded at its ends, and two clamping nuts 18a and 18b.

The exit part of the guide conduit 19 consists of a tubular junction part between a manual valve for closing the guide conduit and the body of the nozzle 18.

Seals 21 are interposed between the connection part of the guide conduit 19 and the body of the nozzle 18. A packing seal 22 is arranged around a part of the thimble 20 where it emerges from the guide conduit 19. A second packing seal 24 is arranged around the thimble 20, at the exit part of the bore in the body of the nozzle 18. The gaskets of the packing seal 24 are held and clamped inside the body of the nozzle 18, and around the thimble 20, by a clamping nut 23 screwed into a tapped opening constituting the exit end part of the bore in the body of the nozzle 18. Leaktight passage of the thimble 20 into the measurement room is thus ensured at the exit of the guide conduit 19.

According to the invention, the measurement device furthermore includes, for each of the guide conduits receiving a thimble, a connection element 25 making it possible to join the entirely smooth end of the thimble 20, at the exit of the nozzle 18, to any cylindrical element which may be an extension conduit of the thimble or a measurement cable.

The connection element 25 will be described with reference to FIGS. 4 and 5.

The connection element 25 includes a body 26 of tubular shape, constituting a sleeve which is penetrated over its entire length by a central bore.

The sleeve 26 includes two threaded parts 26a and 26b at its ends. The threaded part 26a of the sleeve 26 is intended to receive a nut 27 for clamping a device 28 for fastening and leaktight passage of the thimble 20.

The threaded part 26b of the sleeve 26 is intended to receive a nut 29 of a device 30 for fastening and leaktight passage of a smooth cylindrical element 31 which consists of an extension tube of a thimble 20, having a diameter identical to the diameter of the thimble.

Figure 5:
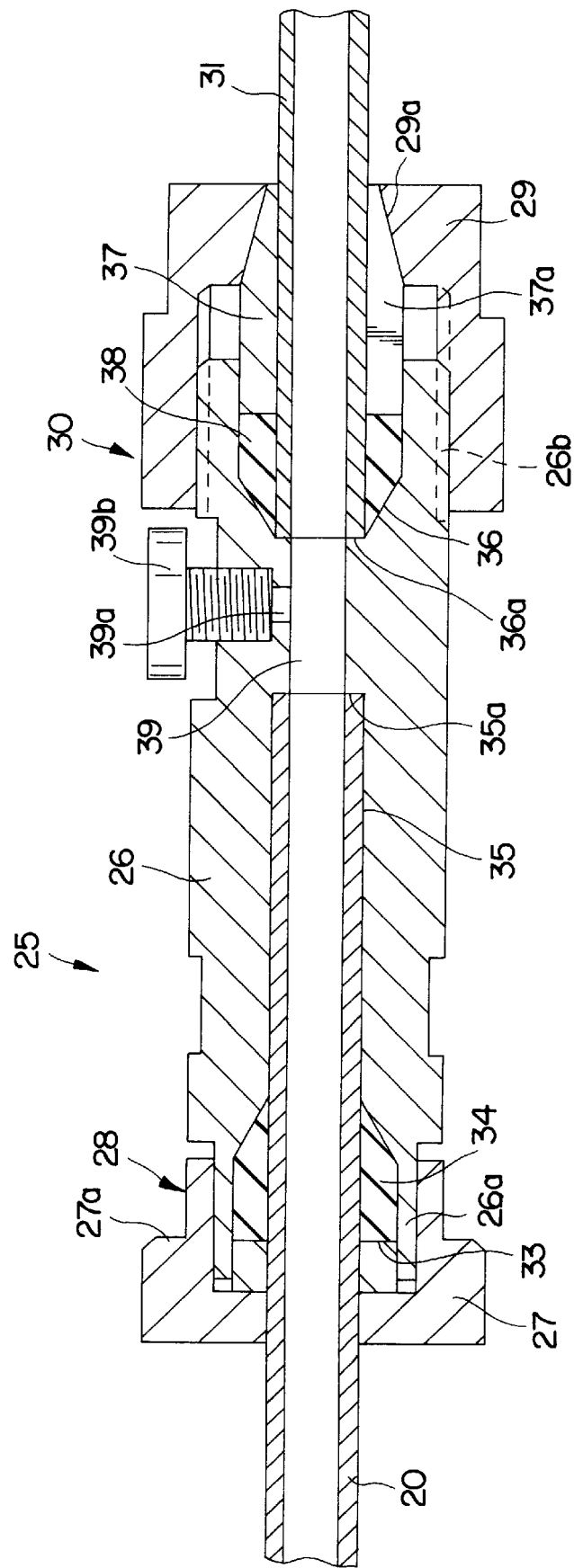
FIG. 5 is a sectional view of an element for connecting and fixing a measurement device, according to the invention and according to a first embodiment.

In the case of the embodiment represented in FIGS. 4 and 5, the extension tube 31 of the thimble is connected, at its end opposite the sleeve 26, to a measurement and displacement assembly making it possible to introduce the probes into the tube 31 and, via the latter, into the thimble 20.

The nut 27 screwed onto the end part 26a of the sleeve 26 includes a plane external surface which bears on a seal 32 housed in a groove machined on the exit end face of the body of the nozzle 18. The nut 27 includes a shoulder 27a on which a corresponding shoulder of the nut 18b of the nozzle 18 engages in order to fix and clamp the nut 27 against the exit face of the body of the nozzle 18. Leaktight fastening of the connection element against the body of the nozzle 18 is thus obtained.

The bore in the sleeve 26 of the connection element 25 includes a large-diameter entry part, opposite the threaded part 26a of the external surface of the sleeve 26 inside which the elements of the packing seal of the fastening and leaktight passage means 28 are housed. The packing seal includes a ring 33 and a seal 34 of cylindro-frustoconical shape which bears at one of its ends on a frustoconical bearing surface constituting the end of the large-diameter entry part of the bore in the sleeve 26. The end of the seal 34 opposite the frustoconical bearing surface constitutes a plane bearing face for the washer 33.

Preferably, the washer 33 is made of stainless steel and the seal 34 is made of graphite.

The face of the ring 33 opposite the seal 34 bears on an internal shoulder of the nut 27, which makes it possible to clamp the seal 34 via the ring 33 when it is screwed onto the threaded part 26a of the sleeve 26.

The bore in the sleeve 26 includes, after the large-diameter part in which the packing seal 33, 34 is housed, a cylindrical smooth part 35, the diameter of which is practically equal to the external diameter of the thimble 20 or slightly greater than this diameter. The part 35 of the bore ends in a shoulder 35a inside the body of the nozzle 26.

In order to ensure fastening and leaktight passage of the end part of the thimble 20 inside the sleeve 26, the totally smooth end part of the thimble 20 is introduced into the bore 35 until its end abuts against the shoulder 35a. This clamps the nut 27 onto the threaded part 26a of the sleeve 26 in order to clamp the seal 24 abutting against the frustoconical part of the entry part of the sleeve in the bore 26, against the external surface of the thimble 20 and in the bore in the sleeve 26. Leaktightness is thus ensured between the thimble and the sleeve 26 of the connection element 25. If the thimble 20 is pierced or cracked inside the nuclear reactor, cooling fluid does not leak through the part for fastening and leaktight passage of the thimble 20 into the entry part of the connection element 25.

The central bore in the sleeve 26 includes a large-diameter exit part 36, of frustoconical shape, at the threaded part 26b of the sleeve 26. The bore 36 ends, inside the sleeve 26, in a shoulder 36a.

The bore 36 constitutes the housing for the end part of the cylindrical element 31 constituting an extension of the thimble 20 and for the packing seal of the device 30 for fastening and leaktight passage of the cylindrical element.

The packing seal of the leaktight passage device 30 includes a cylindro-frustoconical clamping part 37 and a seal 38 of cylindro-frustoconical shape.

The clamping nut 29 of the fastening and leaktight passage device 30 includes a frustoconical internal bore 29a intended to bear on a frustoconical part of the clamping part 37.

A frustoconical end part of the seal 38 abuts against a frustoconical bearing surface of the bore 36 around the shoulder 36a.

The clamping part 37 includes a slot 37a through its entire thickness and along its entire length in the axial direction, so as to constitute a mandrel for clamping the cylindrical element 31 when a clamping effect is exerted via the frustoconical bearing surface 29a of the nut 29.

In order to ensure fastening and leaktight pssage at the end of the cylindrical element 31 in the exit part of the sleeve 26, the end part of the cylindrical element 31 is engaged in the bore 36 until the cylindrical element 31 abuts against the shoulder 36a. The seal 38 of the packing seal penetrates the widened part of the bore 36 and the clamping part 37 is brought to bear against the plane end of the seal 38. The nut 29 is tightened, so as to clamp and compress the seal 38 around the end part of the cylindrical element 31. In addition, tightening of the nut 29 makes it possible to clamp the part 37 against the external surface of the cylindrical element 31 in order to fasten it in the exit part of the connection element 25.

In the central part of the sleeve 26, a bore 39 whose diameter is less than the diameter of the bores 35 and 36 communicates via a lateral channel 39a with a leak detector 39b which can be screwed into a tapped hole passing through the wall of the sleeve 26, in extension of the channel 39a. The leak detector 39b may consist, for example, of a pressure-sensitive switch which can detect a pressure rise in the bore 39 of the sleeve communicating with the internal bore of the thimble 20, if the thimble is pierced or cracked inside the nuclear reactor.

When the thimble is neither pierced or cracked, the pressure in the bore 37 is equal to atmospheric pressure; if pressurized reactor cooling water penetrates the thimble and the bore 39, the leak detector 39b detects a sharp pressure variation. The necessary measures can then be taken in order to prevent the thimble leak from leading to dangerous consequences.

The measurement device according to the invention, including a connection element 25 as represented in FIGS. 4 and 5, makes it possible to separate the end of the thimble 20 from the tubular element of the extension 31 in simple fashion. Indeed, by unscrewing the nut 27, it is possible to separate the connection element and the extension conduit 31 of the thimble 20, which includes an entirely smooth end part introduced into the bore 35.

It is also, of course, possible to separate the extension conduit 31 from the connection element 25 by unscrewing the nut 29.

If it is desired to change a seal on the nozzle 18, or else to repair or replace any element of the guide conduit, the method described above can be employed very simply, which method consists in moving the thimble upstream inside the guide conduit and plugging the open end of the thimble, and the annular space between the thimble and the guide conduit, in leaktight fashion. Indeed, after the connection element 25 has been separated from the end of the thimble 20, an entirely smooth thimble end is available which can be inserted into the guide conduit by using a tool of suitable shape.

Figure 6:
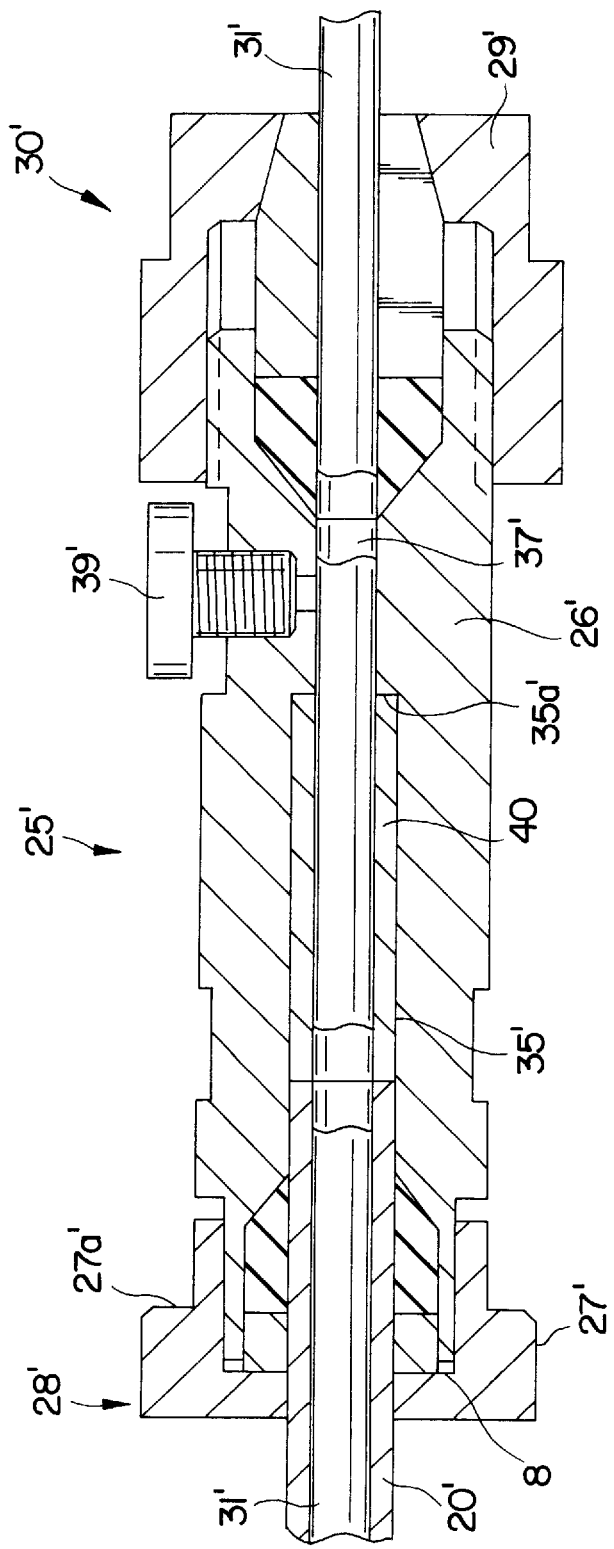
FIG. 6 is a sectional view of an element for connecting and fixing a measurement device, according to the invention and according to a second embodiment.

FIG. 6 represents a second embodiment of a connection element according to the invention.

The corresponding elements on FIGS. 4 and 5, on the one hand, and 6, on the other hand, have the same references. However, the elements of the device represented in FIG. 6 have been given the sign '(prime).

The connection element 25' includes a body 26' having the form of a sleeve penetrated over its entire length by the central opening.

The central opening in the sleeve 26' includes, after a large-diameter entry part in which the elements of the packing seal of a means 28' for fastening and leaktight passage of the thimble 20' are housed, a cylindrical smooth part 35' whose diameter is substantially equal to or slightly less than the external diameter of the thimble 20'.

In the case of the embodiment represented in FIG. 6, the thimble 20' constitutes the protective tubing of a device for measuring physical parameters in the core of the reactor, including fixed probes spaced along the length of a measurement cable 31' housed inside the thimble-type tubing 20'.

In the case of this embodiment, the measurement conduit penetrating the entry part of the connection element 25 consists of the measurement cable protection tubing 20', and the cylindrical element located in extension of the measurement conduit 20' consists of the measurement cable 31' which must be connected, at its end opposite the measurement probes placed inside the measurement conduit 20', to an assembly, for analyzing the measurement signals, arranged inside the measurement room of the nuclear reactor.

As in the case of the connection element 25 according to the first embodiment, the fastening and leaktight passage means 28' includes a packing seal housed in the entry part of the bore in the sleeve 26', which can be clamped in leaktight fashion against the external surface of the measurement conduit 20', by tightening the nut 27' onto a threaded end of the sleeve 26'. Similarly, the fastening and leaktight passage means 30' includes a cylindro-frustoconical clamping element and a seal constituting a gasket which can be clamped against the external surface of the cylindrical element 31' by screwing the nut 29' onto the second threaded end part of the sleeve 26'.

In order to move the wear zones of the tubing 20' of the measurement cable, it is possible to fit a spacer 40 over the measurement cable prior to mounting of the connection element 25', which spacer is introduced, when mounting the connection element 25' in the bore 35', until its end abuts against the shoulder 35'a of the bore in the sleeve 26'. The cable 20' of the measurement cable itself abuts against the second end of the spacer 40. It is thus possible to modify the position of the wear zones of the tubing 20', between two periods of operation of the nuclear reactor.

After a first period of operation of the nuclear reactor, the spacers 40' can be placed in extension of the tubing 20' of the measurement cables of the measurement device according to the invention, so that the tubing is placed inside the nuclear reactor vessel, in a position which is offset axially relative to their position during the first phase of operation of the nuclear reactor.

Of course, in the case of the first embodiment, it is also possible to place a spacer, similar to the spacer 40, and having internal and external diameters identical to the diameter of a thimble, in abutment at one end on the shoulder 35*a* and, at its second end, on the end of the thimble 20. This modifies the position of the wear zones of the thimble in which the mobile probes are moved inside the nuclear reactor vessel.

In the case of using a fixed-probe device, as represented in FIG. 6, when the thimble-type tubing 20' of a measurement cable connected to the fixed probes is pierced or cracked, the pressurized water of the nuclear reactor penetrating the tubing 20' remains confined inside the connection element 25' and cannot escape into the measurement room. Indeed, the packing seal of the leaktight passage means 28' prevents any leak at the periphery of the tubing 20' and the packing seal of the leaktight passage means 30' prevents any cooling water from passing the periphery of the cylindrical element 31'. The presence of pressurized water in the central part 37' of the opening in the sleeve 26' can be detected by a leak detector 39' consisting, for example, of a pressure-sensitive switch.

Of course, the connection element 25' according to the second embodiment, which is represented in FIG. 6, may be connected to a nozzle, such as the nozzle 18' of a guide conduit as represented in FIG. 4, via the nut 27' of the means 28' for fastening to the first end of the connection element 25' which bears and is fixed, via a nut 18*b* of the nozzle, against the body of the nozzle 18, with interposition of a seal.

The measurement device according to the invention, including connection elements similar to the elements 25 or 25' which have just been described, fixed on the end parts of each of the measurement conduits, at the exit of a guide conduit, allow very simple separation of the measurement conduit from an extension element of the measurement conduit, for the purpose of moving the measurement conduit inside its guide conduit, for example in order to modify the position of wear zones or for carrying out a repair on an element of the guide conduit. The device according to the invention also makes it possible to prevent any leak of cooling water from the reactor into the measurement room if thimble-type tubing of a measurement conduit holding probes in a fixed position is pierced.

The invention is not limited to the embodiments which have been described. Thus, the sleeve constituting the body of the connection element according to the invention may have a form which is different from those described.

The fastening and leaktight passage means located at the ends of the sleeve of the connection element may also be produced in a different way.

The connection element of the device according to the invention may be fixed on the nozzle for passage of the measurement conduit in a manner different from that which has been described, or else this connection element may be fixed on an element of the guide conduit other than the leaktight passage nozzle.

The invention applies to devices for measuring physical parameters inside the core of a nuclear reactor, regardless of whether these devices use mobile probes or fixed probes.

I claim:

1. Device for measuring at least one physical parameter inside the core of a nuclear reactor, including a measurement conduit (20, 20') of elongate shape, a conduit (5, 19) for guiding the measurement conduit (20, 20') between a measurement room (3) and the nuclear reactor core arranged inside a vessel (1), a means (18) for leaktight passage of the measurement conduit (20, 20') at one end of the guide conduit (5, 19), located in the measurement room (3), and an element (31, 31') constituting an extension of the measurement conduit (20, 20'), characterized in that it includes an element (25, 25') for connecting an end part of the measurement conduit (20, 20') to the extension element (31, 31'), including a body consisting of a tubular sleeve (26, 26') comprising, along its axis, a first bore (35, 35') for receiving the end part of the measurement conduit (20, 20') having an entirely smooth cylindrical surface, extending between a first axial end of the sleeve (26, 26') and a shoulder (35*a*, 35'*a*) inside the sleeve (26, 26'), a second bore (36, 36') for receiving the smooth cylindrical extension element extending to the second axial end of the sleeve (26, 26'), a first removable means (28, 28') for fastening and leaktight passage of the measurement conduit (20, 20') at the first end of the sleeve (26, 26') for ensuring leaktight passage of the measurement conduit (20, 20') into the first bore (35, 35') of the sleeve (26, 26'), and a second removable means (30, 30') for fastening and leaktight passage of the smooth cylindrical extension element at the second end of the sleeve (26, 26') for ensuring leaktight passage of the smooth cylindrical extension element into the second bore (36, 36') of the sleeve (26, 26').

2. Measurement device according to claim 1, characterized in that the first removable fastening and leaktight passage means (28, 28') and the second removable fastening and leaktight passage means (30, 30') each include a nut (27, 27', 29, 29') engaging with a threaded end part (26*a*, 26*b*) of the external surface of the sleeve (26) and a packing seal which can be clamped by the nut (27, 27', 29, 29').

3. Measurement device according to claim 2, characterized in that each of the packing seals of the fastening and leaktight passage means (28, 28', 30, 30') includes an annular clamping part (33, 37) and an annular seal (34, 38) which are arranged around the measurement conduit (20, 20') and around the smooth cylindrical element (31, 31'), respectively, the clamping ring (33, 37) being interposed between one face of the seal (34, 38) and a bearing surface of the corresponding nut (27, 27', 29, 29').

4. Measurement device according to claim 3, characterized in that at least one of the annular clamping parts (33, 37) includes at least one slot through its entire thickness in order to allow diametrical retraction of the clamping part around the cylindrical element (31, 31') of the measurement conduit (20, 20') during clamping of the packing seal.

5. Measurement device according to claim 3, characterized in that the annular clamping part (33, 37) is made of stainless steel, and in that the annular seal (34, 38) is made of graphite.

6. Device according to claim 2, characterized in that the packing seals of the fastening and leaktight passage means (28, 28', 30, 30') are arranged inside a widened-diameter end part of an internal bore in the sleeve (26, 26').

7. Measurement device according to claim 6, characterized in that the widened-diameter end parts of the bore in the sleeve (26) include a frustoconical bearing surface at their end located inside the sleeve (26), constituting an abutment surface for an annular seal (34, 38).

8. Measurement device according to claim 1, characterized in that the sleeve (26, 26') includes, between the first bore (35, 35') and the second bore (36, 36'), a central third bore (37) which joins the first bore (35, 35') to the second bore (36, 36') and communicates with a leak detector (39, 39').

9. Measurement device according to claim 1, characterized in that the connection element (25, 25') includes a part (27, 27') allowing the connection element (25, 25') to be fastened onto a part of the means (18) for leaktight passage of the measurement conduit (20, 20').

10. Device according to claim 9, characterized in that the connection element (25, 25') is fixed on a tubular body of a nozzle (18) for leaktight passage of the measurement conduit (20, 20') by a nut (18b) screwed on a threaded part of the body of the nozzle (18) that bears on a part (27) of the first means (28) for fastening and leaktight passage of the measurement conduit (20, 20') in the first bore (35, 35') of the sleeve (26, 26') of the connection element (25, 25').

11. Measurement device according to claim 1, characterized in that the measurement conduit (20, 20') is a thimble for moving mobile probes for measuring a physical parameter in the core of the nuclear reactor, and in that the smooth cylindrical extension element (31, 31') is a tubular element providing passage for the measurement probes from a displacement and measurement assembly in the measurement room (3) to the measurement conduits (20, 20').

12. Device according to claim 1, characterized in that the smooth cylindrical extension element is a measurement cable on which are fixed measurement probes placed in fixed position inside the measurement conduit (20, 20').

13. Device according to claim 1, characterized in that it furthermore includes a spacer (40), interposed between the end of the measurement conduit (20') and the internal shoulder (35'a) of the first bore (35') in the sleeve (26'), inside the first bore (35') in the sleeve (26') in the connection element (25').

* * * * *